Patented Dec. 25, 1928.

1,696,709

UNITED STATES PATENT OFFICE.

FREDERICK G. DOKKENWADEL, OF MOBILE, ALABAMA, ASSIGNOR OF ONE-TENTH TO T. W. MILLNER, ONE-TENTH TO V. R. WALLEY, ONE-TENTH TO B. M. STEVENS, ONE-TENTH TO E. C. FISHEL, AND ONE-TENTH TO J. E. GREEN, ALL OF RICHTON, MISSISSIPPI.

INSECTICIDAL PLANT FOOD OR FERTILIZER.

No Drawing. Application filed November 19, 1926. Serial No. 149,527.

My invention relates to an improved plant food or fertilizer having insecticidal or insect repelling qualities.

A principal feature of the invention is the provision of a new base or body material, namely, cotton seed hulls, which are combined and impregnated with active fertilizing materials such as the commercial nitrates, phosphates and potashes, the particular fertilizing materials and the quantities employed depending upon the character of the soil, the nature of plants to be treated and other considerations. The active ingredients are applied in solution to the cotton hulls so that the hulls are saturated and coated with the solution. Cotton seed hulls are available practically throughout the southern portions of the United States and elsewhere, and may be secured at very low cost. By study and experiment I have discovered and demonstrated that this easily procurable, fibrous or cellular material readily absorbs the active materials, and after being properly mixed and dried and placed in the soil any surface coating of the active ingredients may be dissolved by soil moisture and disseminated with considerable rapidity through the adjacent soil, but the active material incorporated within the fibrous structure of the hulls is retained for a relatively long period and is dissolved and disseminated gradually so that the supply of the fertilizing agents to the plant roots is properly controlled and maintained over a relatively long period, thus avoiding undue stimulation of the plants and reducing the number of fertilizer applications.

Another important feature of the invention is the incorporation in the fertilizer or plant food of a suitable insecticidal, or insect and vermin repelling, material. Crude carbolic acid is preferred for this purpose. The acid is properly diluted with water and incorporated in the fertilizer in such proportion that it has no deleterious effect upon the active fertilizing agents, but after the fertilizer is placed in the soil, the acid component acts directly to kill various forms of insect life, such as eggs or nits, onion or other maggots, cut-worms or other pests. The odor of the insecticide is also obnoxious and repellant to many classes of insects which may not be killed by its direct action, and such insects including ants, potato-bugs and others, are driven away.

The cotton hulls constituting the base or body material are employed primarily as a carrier for the active fertilizing agents and insecticide, and are not relied upon as an active fertilizing material, except, of course, that they contribute a substantial amount of humus. The hulls are employed principally or entirely as an absorbent carrier or retainer of the active material and insecticide, retaining these materials for relatively long periods and disseminating them gradually for the proper enrichment of the soil, supply of plant food and to plant roots, and destruction or repulsion of insects and other pests, as sufficiently explained above.

I will now give one representative example of a fertilizer embodying the invention and adapted for certain soils or plants, and also explain how it may be made or compounded. It should be understood that the ingredients and proportions may be varied greatly, in accordance with varying conditions or purposes for which the material is to be used, and also that the process of manufacture may be varied without departing from the invention.

For a ton of my plant food corresponding generally to 4—7—7 commercial fertilizer, I use approximately the following quantities of materials: 400 lbs. cotton seed hulls, 448 lbs. nitrate of soda, 1008 lbs. phosphoric acid, 280 lbs. muriate of potash. 20 lbs. of the nitrate of soda and 15 lbs. of the potash are dissolved in approximately 25 gallons of water, and the solution is applied to the hulls, which are thus moistened sufficiently to absorb and retain the rest of the fertilizing ingredients, which are prepared in fine or granular form and mixed with the moistened hulls. The fertilizing materials are thus absorbed into the fibrous structure of the hulls, which act as a carrier to gradually disseminate the active materials through adjacent soil, in the manner sufficiently described above.

When it is desired to include an insecticide for purposes above stated, I use approximately one gallon of crude carbolic acid which is diluted with approximately twenty gallons of water, and this solution serves for the above stated amount, 400 lbs. of cotton seed hulls. The solution is sprinkled over the hulls and mixed thoroughly with them before the active fertilizing materials are added, in the manner above described.

Obviously the active materials may be varied in proportions to correspond to the proportions of any standard fertilizing mixtures.

I claim:

1. A plant food or fertilizer comprising cotton seed hulls and active fertilizing material incorporated with the hulls, which act as a body material or carrier to retain and gradually disseminate the active material in soil under the action of soil moisture.

2. A plant food or fertilizer comprising cotton seed hulls and active fertilizing material, and insecticidal and insect repelling material incorporated with the hulls, which act as a body material or carrier to retain and gradually disseminate the active materials in soil under the action of soil moisture.

3. A fertilizer comprising cotton seed hulls as a carrier or body material, and as active fertilizing agents nitrates, phosphates and potash, the body material being impregnated with the active fertilizing agents and serving to retain and gradually disseminate the active agents through adjacent soil.

4. A fertilizer comprising cotton seed hulls as a carrier, and as active fertilizing agents nitrates, phosphates and potash, and carbolic acid, the carrier being impregnated with the active fertilizing agents and acid, and serving to retain and gradually disseminate the active agents through adjacent soil, the acid acting to destroy certain insect pests and to drive away others by its repellent odor.

Signed at Richton in the county of Perry and State of Miss. this 15th day of November A. D. 1926.

FREDERICK G. DOKKENWADEL.